(12) United States Patent
Scudder

(10) Patent No.: US 9,057,889 B2
(45) Date of Patent: Jun. 16, 2015

(54) OCULAR PRODUCT CUSTOMIZATION

(71) Applicant: Crystal Scudder, Rosco, IL (US)

(72) Inventor: Crystal Scudder, Rosco, IL (US)

(*) Notice: Subject to any disclaimer, the term of this patent is extended or adjusted under 35 U.S.C. 154(b) by 67 days.

(21) Appl. No.: 13/803,510

(22) Filed: Mar. 14, 2013

(65) Prior Publication Data

US 2014/0268003 A1    Sep. 18, 2014

(51) Int. Cl.
*G02C 5/14*            (2006.01)
*G02C 11/02*           (2006.01)

(52) U.S. Cl.
CPC ........................ *G02C 11/02* (2013.01)

(58) Field of Classification Search
USPC ............ 351/122, 47, 57, 44, 41, 111, 51, 52, 351/158
See application file for complete search history.

(56) References Cited

U.S. PATENT DOCUMENTS

| 3,526,450 | A  | * | 9/1970  | Berry ............................. 351/52 |
| 3,993,403 | A  | * | 11/1976 | Brown .......................... 351/178 |
| 4,222,640 | A  | * | 9/1980  | Bononi ........................... 351/83 |
| 4,729,650 | A  | * | 3/1988  | Jennings ........................ 351/47 |
| 4,786,158 | A  | * | 11/1988 | Barfus-Shanks et al. ...... 351/122 |
| 5,371,554 | A  | * | 12/1994 | Aspesi ............................ 351/52 |
| 6,139,144 | A  | * | 10/2000 | Hynansky ..................... 351/158 |
| 6,270,217 | B1 | * | 8/2001  | Lizzi ............................. 351/122 |
| 7,524,057 | B2 | * | 4/2009  | Agazarova ................... 351/158 |
| 7,708,400 | B2 | * | 5/2010  | Coleman et al. ............. 351/122 |

* cited by examiner

*Primary Examiner* — Hung Dang
(74) *Attorney, Agent, or Firm* — Locke Lord LLP

(57) ABSTRACT

A device is comprised of a first portion shaped like an ocular product frame and designed to substantially cover the ocular product frame. The cover has a second portion substantially shaped like an ocular product leg and designed to substantially cover the ocular product leg. The second portion of the cover couples to the first portion of the cover.

20 Claims, 12 Drawing Sheets

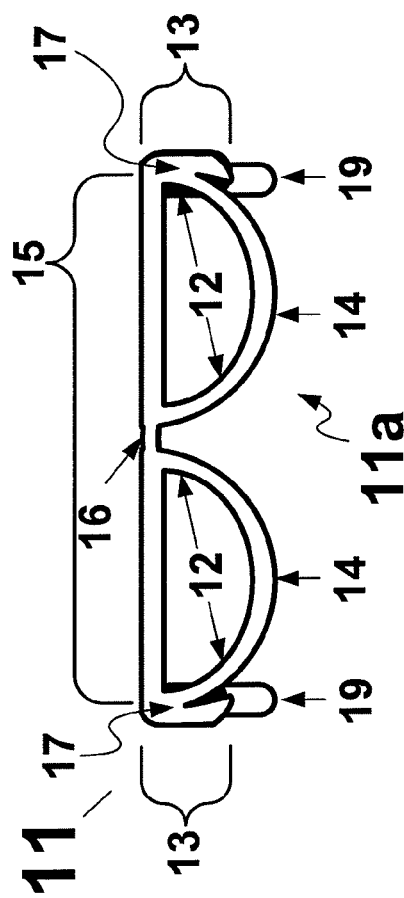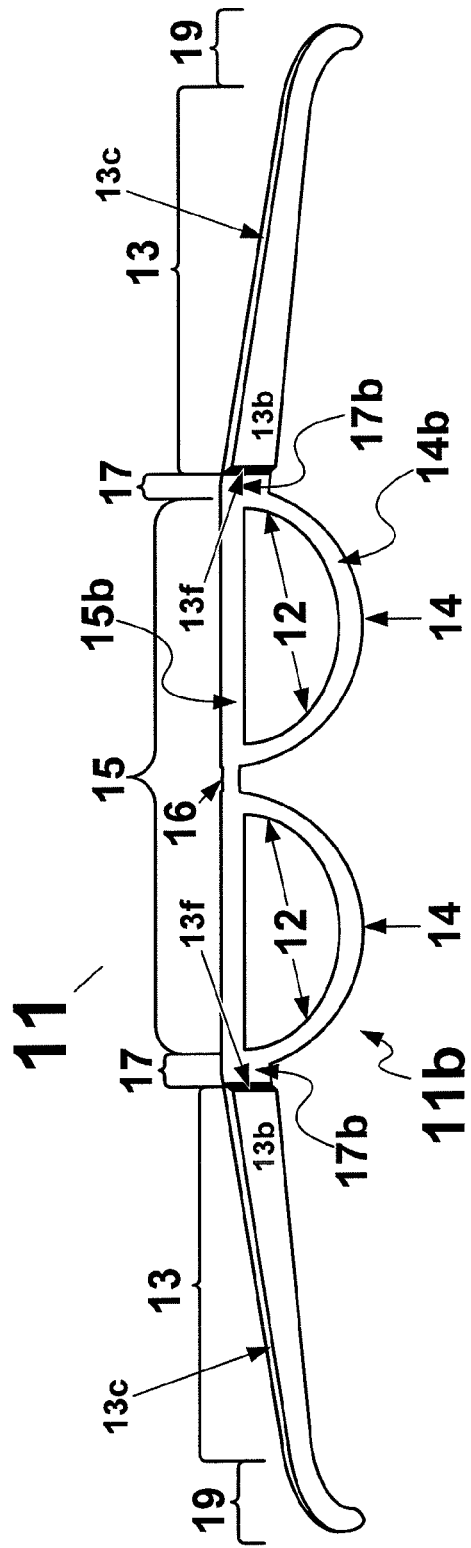

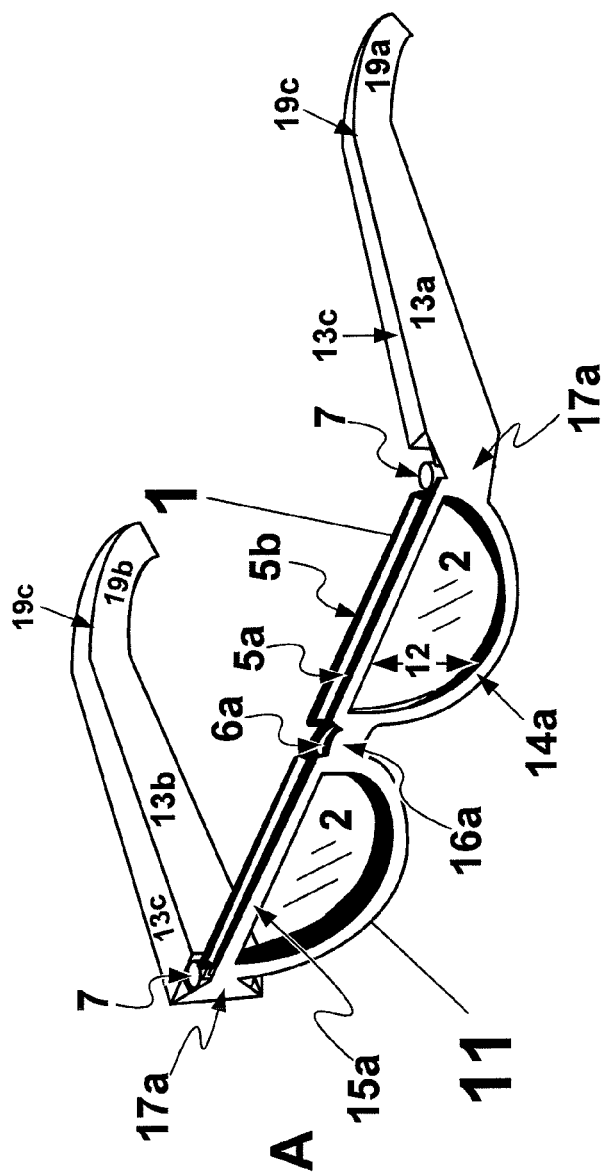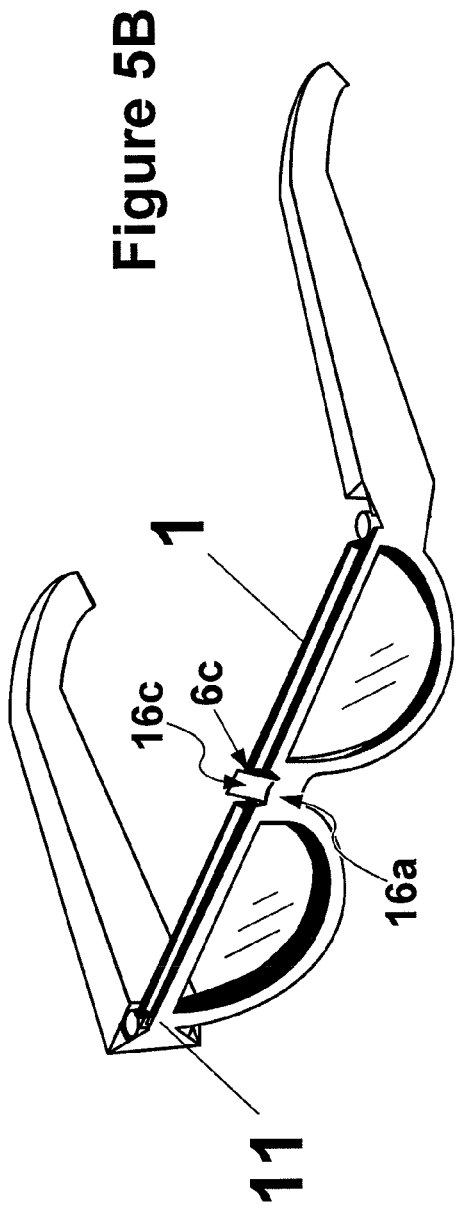

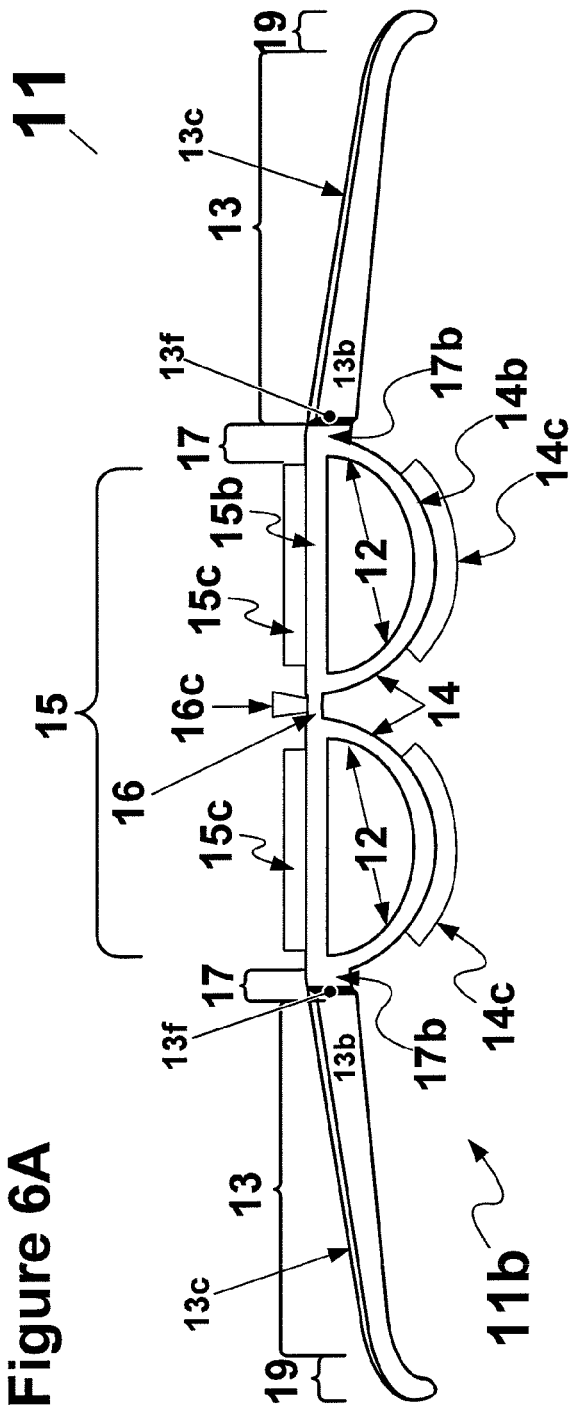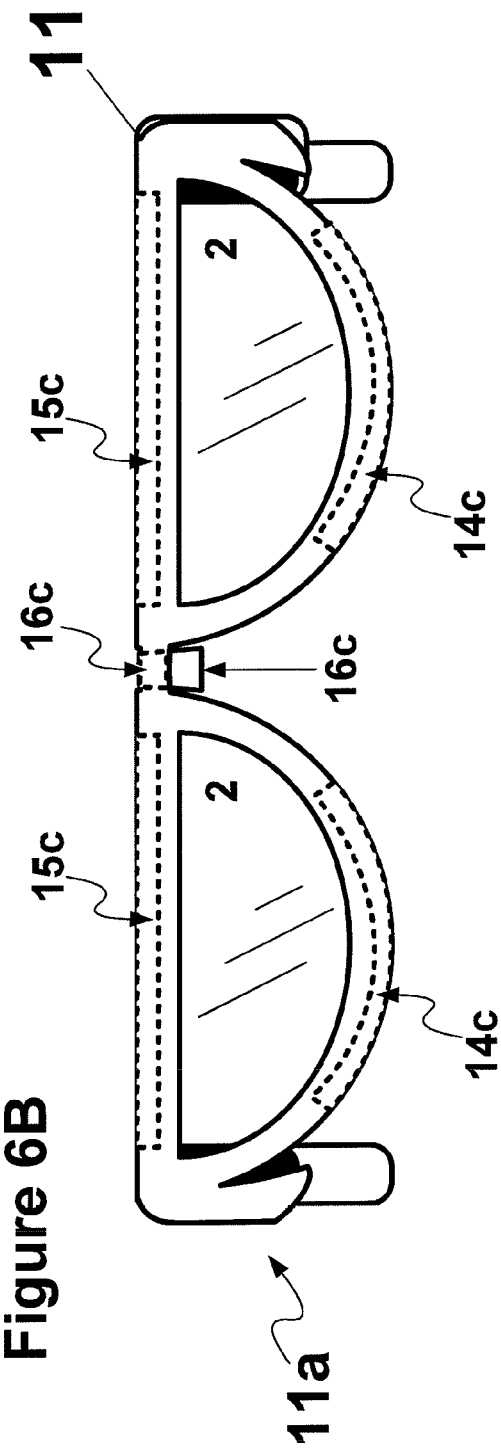

OCULAR PRODUCT CUSTOMIZATION

TECHNICAL FIELD OF THE INVENTION

The present invention relates to customizable ocular products and methods for creating and using the same.

BACKGROUND

Many assortments of ocular products, such as eyeglasses, sunglasses, and sports glasses, have a variety of frames. Some ocular products use frames that are retrofitted to hold a particular lens, while others use frames that are stylized according to brand, user needs, or for other reasons. However, once a particular ocular product is selected and purchased, a user cannot readily exchange the frame for another style or design without having to re-purchase a new frame.

Therefore, it is desirable to provide a device that can be used to provide customization of any pair of ocular products, in particular, ocular product frames.

SUMMARY OF THE INVENTION

The present invention involves a device having a first portion substantially shaped like an ocular product frame and designed to substantially cover the ocular product frame and a second portion substantially shaped like an ocular product leg and designed to substantially cover the ocular product leg, wherein the second portion couples to the first portion.

The present invention may include openings in the first portion, the second portion, or combination of the two.

The present invention also involves a method for customizing an ocular product, involving bending a first portion of a cover, wherein the cover is designed to couple to an ocular product frame, the cover being coupled to at least two second portions designed to couple to an ocular product leg, coupling two legs of an ocular product to the at least two second portions by bypassing the bent first portion, and unbending the first portion of the cover to couple to the ocular product frame.

The present invention also involves modular assembly of the cover from the first portion and the second portion when each is made to couple to an ocular product.

BRIEF DESCRIPTION OF THE DRAWINGS

The present disclosure will become more fully understood from the detailed description and the accompanying, interrelated embodiments exemplified in the following figures and drawings.

FIG. 3A illustrates a front view of another exemplary ocular product customization.

FIG. 3B illustrates a backside view of another exemplary ocular product customization.

FIGS. 5A and 5B illustrate various exemplary ocular products in combination with an exemplary ocular product customization.

FIG. 6A illustrates a backside view of yet another exemplary ocular product customization.

FIG. 6B illustrates a front view of another exemplary ocular product in combination with another exemplary ocular product customization.

Figure 1A:
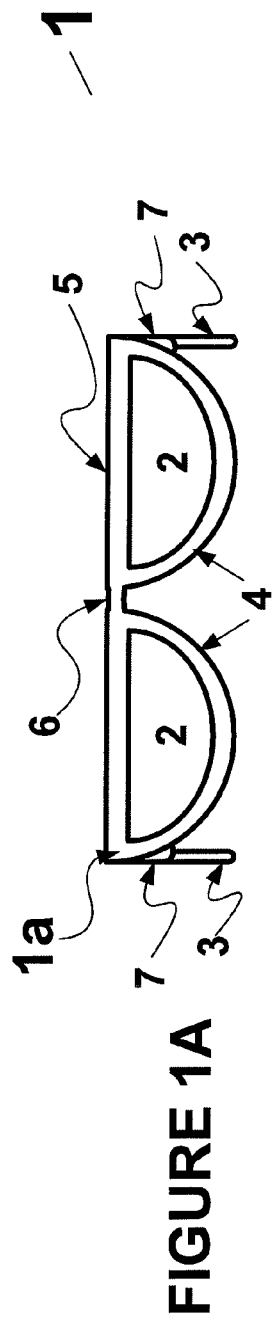
FIG. 1A illustrates a front view of an exemplary ocular product.

In the drawings like characters of reference indicate corresponding parts in the different figures. The drawings are non-limiting examples of the disclosed embodiments of the present invention and corresponding parts in the different figures may be interchanged and interrelated to the extent such interrelationship is described or inherent from the disclosures contained herein.

DETAILED DESCRIPTION

Referring to the illustrative embodiment of FIG. 1A, ocular product 1 forms vision portals 2 within a top frame portion 5 and a bottom frame portion 4 connected to one another by bridge 6. Front surface 1a of ocular product 1 may be the surfaces furthest from the user's face when ocular product 1 is worn. To be worn, ocular product 1 may have a pair of legs 3 coupled to its frame portions 4 or 5 via hinges 7.

An exemplary ocular product 1 may include eyeglasses, sunglasses, sports glasses, goggles, or any other type of product that is worn on a user and substantially intercepts the user's vision. According to the illustrative embodiment of FIG. 1, ocular product 1 may have vision portals 2 for holding other objects, such as lenses. An exemplary lens may be made out of glass, plastic, or any other material for making such lenses known to those skilled in the art. Alternatively, vision portals 2 may be substantially or completely devoid of material interrupting the vision of a user of ocular product 1. For example, certain ocular products may have shutter shades within their vision portals 2. Exemplary ocular products 1 may be made of a variety of materials such as plastic, metals, paper, cardboard, or any other materials known to those skilled in the art for the purpose.

An exemplary leg 3 of ocular product 1 may be shaped, dimensioned, or formed in any manner to provide coupling of the frame portions 4/5 to a user. An exemplary leg 3 may be narrow extensions of materials that taper from the hinge 7 point towards their ends that bend inwardly toward bridge 6 as they extend distally from hinge 7. Legs 3 may be made out of the same or similar materials as ocular product 1, and legs 3 may be coupled to hinge 7 by any mechanical, chemical, adhesive, or other connection means known to those skilled in the art.

Exemplary lower frame portions 4 may be shaped in any fashion to hold an object to be contained within vision portal 2, or may alternatively be omitted where items within vision portal 2 may only need to be supported by frame portion 5. Frame portions 4 and 5 may be made of the same or similar material or may be composed of different materials. Frame portions 4 and 5 may be joined together in any fashion known to those skilled in the art or may be integrated with one another as a single component.

An exemplary bridge 6 may be formed of the same materials as frame portions 4 and/or 5. Further, bridge 6 may be shaped or molded in any fashion to allow for ocular product 1 to be worn by a user. Where an exemplary ocular product 1 is to be worn on a user's nose, bridge 6 may be arced to permit the ocular product 1 to rest on the user's nose. Alternatively, bridge 6 may contain one or more pads, cushions, or other materials that enable it to be worn by a user. Other types and varieties of bridge 6 may be understood by those skilled in the art which would be substantially equivalent to those disclosed structures permitting ocular product 1 to be worn by a user.

An exemplary hinge 7 may be a rotatable hinge, a spring hinge, an elastic hinge, a flexible piece of material, a substantially resilient connector piece, or any other mechanical or material connection between frame portions 4 or 5 and leg 3 capable of allowing the ocular product 1 to be worn by a user.

Figure 1B:
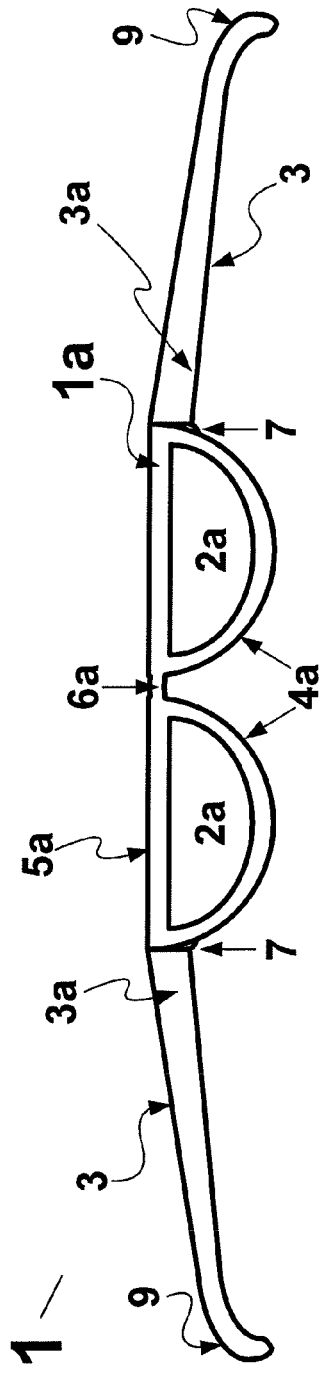
FIG. 1B illustrates another frontal view of an exemplary ocular product.

Referring to the illustrative embodiment of FIG. 1B, front surface 1a of ocular product 1 is shown but with its legs 3 opened. The various components of an exemplary ocular product 1 also have their own front, back, and side planes. For example, the front plane 2a of vision portal 2 is the plane furthest from the user's face when ocular product 1 is worn. Front face 3a of leg 3 is likewise the face of leg 3 which is furthest from the face of the user when an exemplary ocular product 1 is worn. Front face 4a of lower frame portions 4 is the face of frame portion 4 which is furthest from the face of the user when an exemplary ocular product 1 is worn. Front face 5a of upper frame portions 5 is the face of frame portion 5 which is furthest from the face of the user when an exemplary ocular product 1 is worn. Front face 6a of bridge 6 is the face of bridge 6 which is furthest from the face of the user when an exemplary ocular product 1 is worn.

As further illustrated in the exemplary embodiment of ocular product 1 according to FIG. 1B, legs 3 couple to frame portions 4/5 via hinges 7. Legs 3 may be integrated with temple arms 9. Exemplary temple arms 9 may be made of the same or different material as legs 3, such as, plastic, metal, paper, cardboard, or any other suitable materials known to those skilled in the art. Additionally, temple arms 9 may be malleable or resilient to achieve a desired fitting on a user.

Figure 1C:
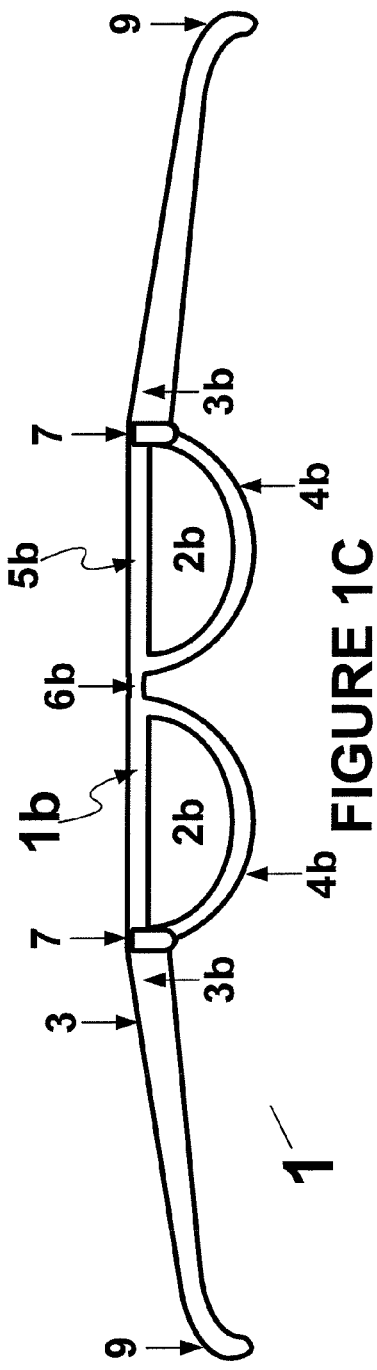
FIG. 1C illustrates a backside view of an exemplary ocular product.

Referring to the illustrative embodiment of FIG. 1C, the backside face 1b of ocular product 1 is shown and may be the face closest to the face of a user when ocular product 1 is worn by a user. For example, the backplane 2b of vision portal 2 is the plane closest to the user's face when ocular product 1 is worn. Back face 3b of leg 3 is likewise the face of leg 3 which is closest to the face of the user when an exemplary ocular product 1 is worn. Back face 4b of lower frame portions 4 is the face of frame portion 4 which is closest to the face of the user when an exemplary ocular product 1 is worn. Back face 5b of upper frame portions 5 is the face of frame portion 5 which is closest to the face of the user when an exemplary ocular product 1 is worn. Back face 6b of bridge 6 is the face of bridge 6 which is closest to the face of the user when an exemplary ocular product 1 is worn. While not shown, it should be understood that temple arms 9 may also have front, back, and other faces depending on its shape and configuration.

Figure 1D:
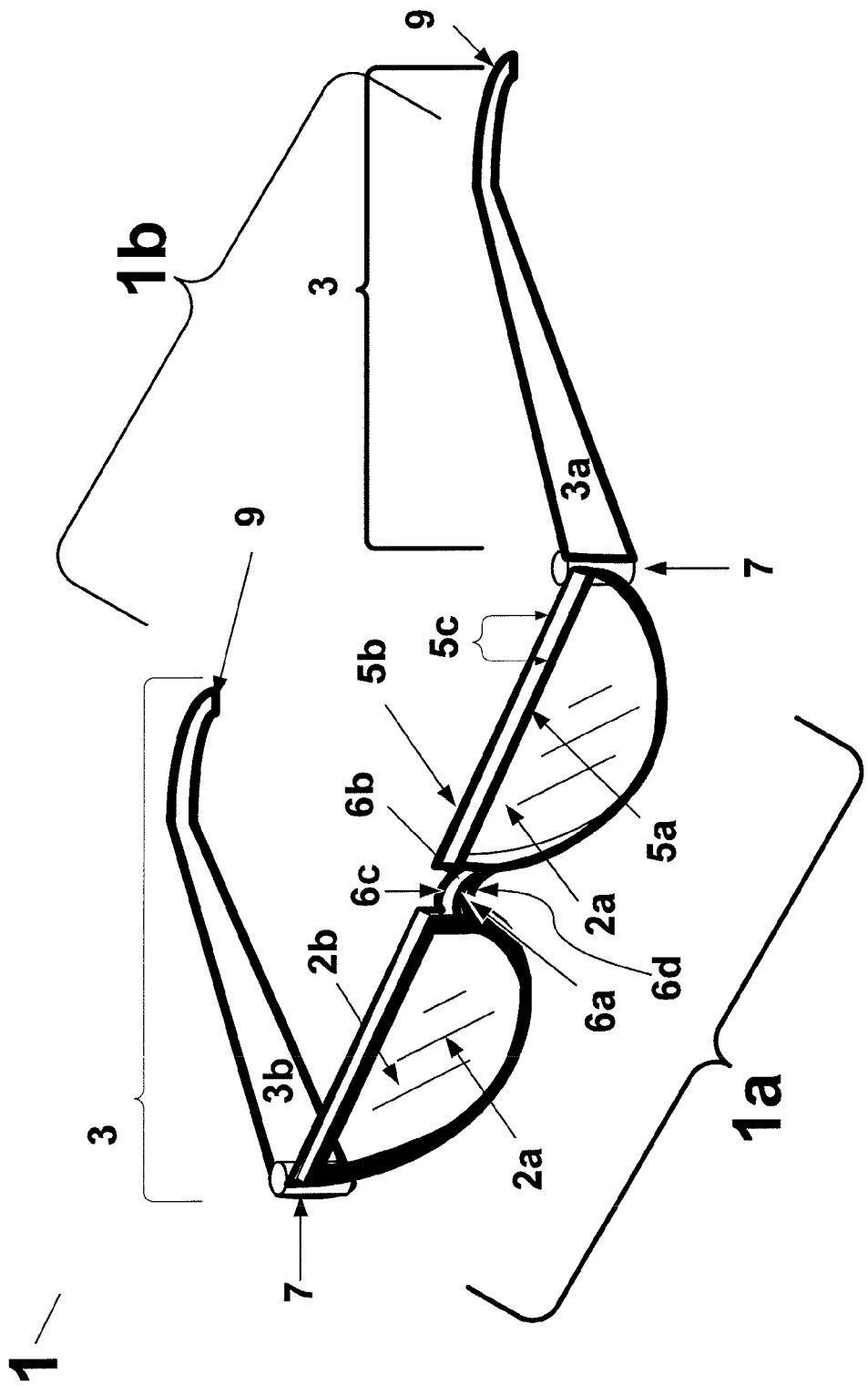
FIG. 1D illustrates an isometric view of an exemplary ocular product.

Keeping in mind the disclosures related to FIGS. 1A, 1B, and 1C, the illustrative embodiment of FIG. 1D may show an exemplary ocular product 1 in an isometric view exposing each of its front face 1a and back face 1b. Additional dimensions of the various ocular product 1 components may also be seen, for example, top face 6c of bridge 6 and top face 5c of upper frame portion 5. Top face 5c and 6c of top frame portion 5 and bridge 6, respectively, is the face that lies substantially between front faces 5a and 6a and back faces 5b and 6b of top frame portion 5 and bridge 6, respectively. As illustrated, an exemplary ocular product 1 may contain lenses within vision portals 2 having front faces 2a and back faces 2b. While an exemplary ocular product 1 may have numerous faces and dimensions as shown in FIGS. 1A, 1B, 1C, and 1D, those skilled in the art may recognize numerous other dimensions of the parts comprising an exemplary ocular product 1 which may be utilized in accordance with or be substantially suitable for the teachings disclosed herein.

Figure 2A:
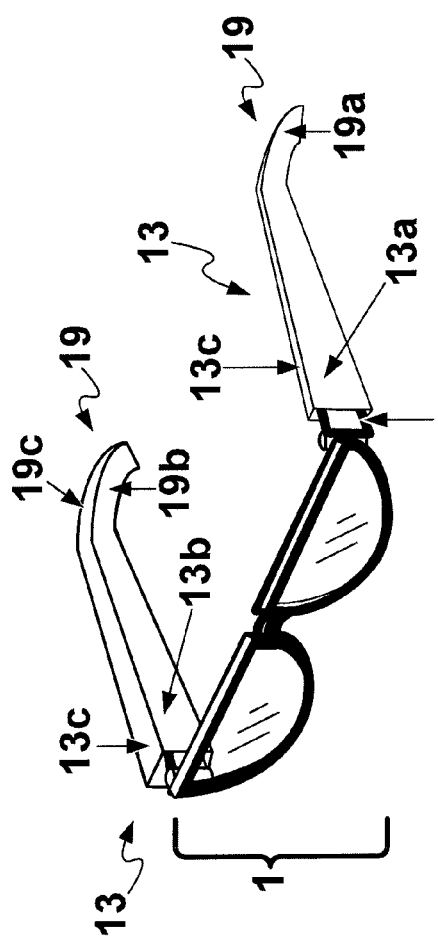
FIGS. 2A, 2B, 2C, 2D, 2E, 2F, and 2G illustrate a variety of exemplary ocular product customizations.
Figure 2B:
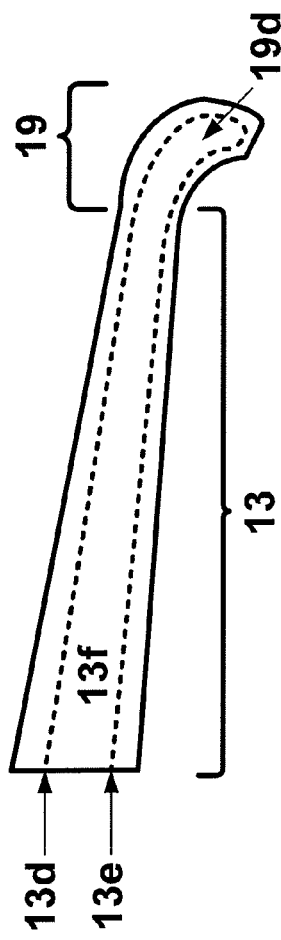
Figure 2C:
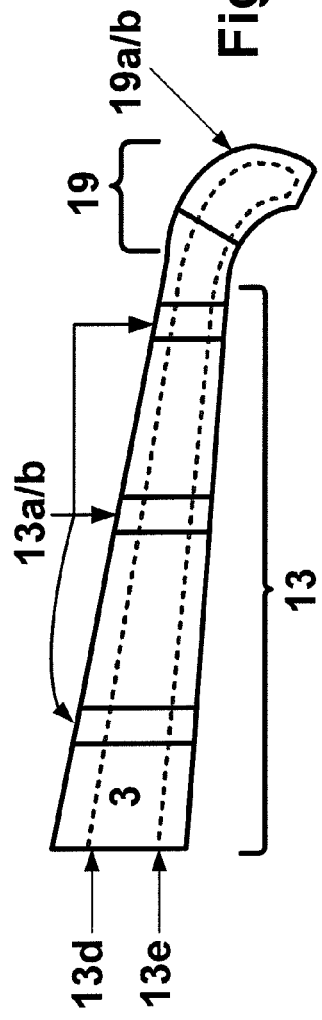

Referring to the illustrative embodiments of FIGS. 2A, 2B and 2C, an exemplary ocular product 1 may be customized with sleeves 13 going over or around one or more of legs 3. For example, according to an exemplary embodiment of a sleeve 13 illustrated in FIG. 2A, sleeve 13 may have a front face 13a, a back face 13b, and a top face 13c that lies in between the front face 13a and back face 13b of sleeve 13. At a distal position on sleeve 13 may be a portion that covers temple arm 9, known as hood 19 with a front face 19a, back face 19b, and, optionally a top face 19c. Each of front faces 13a and 19a are those faces that are furthest from the user when ocular product 1 fitted with customization sleeve 13 is worn by the user. Back faces 13b and 19b are those faces closest to the user when ocular product 1 fitted with customizations 13 is worn by the user. According to the illustrative embodiment of FIG. 2B, an exemplary ocular product 1 may slide its legs 3 into sleeve 13. In an exemplary configuration, legs 3 may slide into channel 13f in sleeve 13, which may be substantially conformed to the shape and size of an exemplary leg 3. Legs 3 may alternatively be received via docking edges 13d and 13e within cover 3. Additionally, an exemplary sleeve 13 may contain an arm receptacle 19d for receiving temple arm 9 and keeping it enclosed within sleeve 13. In another variation, receptacle 19d may only be substantially closed about the surface of temple arm 9 permitting at least a portion of the same to be exposed, depending on what may be desired.

According to the illustrative embodiment of FIG. 2C, sleeve 13 may only partially surround leg 3 and may be held on either of front 3a or back 3b faces of leg 3 by one or more cover portions 13g. As such, sleeve 13 may still receive leg 3 by providing access for leg 3 to slip under at least one portion 13g so as to allow a face of sleeve 13 (the front or back face depending on the style of cover) to come in contact with the corresponding opposite face of leg 3. For example, sleeve 13 may have cover portions 13g extending about the back face 13b of sleeve 13. When leg 3 of ocular product 1 is placed within sleeve 13, the front face 3a of leg 3 will be in contact with back face 13b of sleeve 13 while the back face 3b of leg 3 will be held within sleeve 13 by at least one cover portion 13g.

Similarly, front face 19a or back face 19b of temple hood 19 may be used in conjunction with the cover portions 13g of an exemplary sleeve 13 as illustrated in FIG. 2C to hold a distal end of temple arm 9. In an alternative embodiment according to FIG. 2C, hood 19 may be a cup-shaped portion of sleeve 13 into which the most distal end of temple arm 9 rests. In one variation, hood 19 stretches over arm 9 to create a friction fit with arm 9 and the inside of sleeve 13.

Figure 2D:
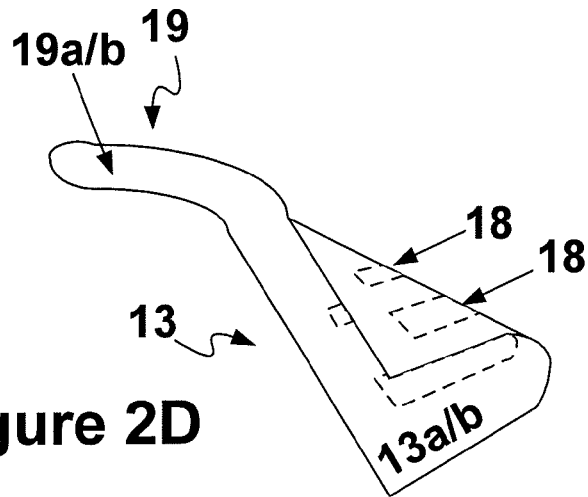

With reference to the illustrative embodiment of FIG. 2D, sleeve 13 may be made from bending or folding one or more sheets of material and removing portions 18 to permit passage of an exemplary leg 3 of an exemplary ocular product 1. Further illustrated in FIG. 2D may be a portion of hood 19 material that may be used to wrap on or about arm 9. In accordance with the illustrative embodiment of FIG. 2D, sleeve 13 faces 13a/b may be coated with any non-permanent adhesive or may be made of other such suitable materials that may adhere non-permanently to the surfaces of ocular product 1, including, but not limited to arms 3, frame portions 4/5, bridge 6. Alternatively, sleeve 13 faces 13a/b may be made of suitable material to stick to itself when wrapped about components of ocular product 1. For example, sleeve 13 may be a sticker material that may be adhered to the front face of leg 3 and arm 9. Alternatively, sleeve 13 may be coated with non-permanent adhesives, such as UGlu, rubber cement, gummy glues, such as those made by Power Adhesives and available from Hotmelt.com located in Edina, Minn. Sleeve 13 may also be made of silicone, polymer, elastomer, stretchy fibers, and any other flexible materials that may be made to mount on exemplary ocular products 1.

Figure 2E:
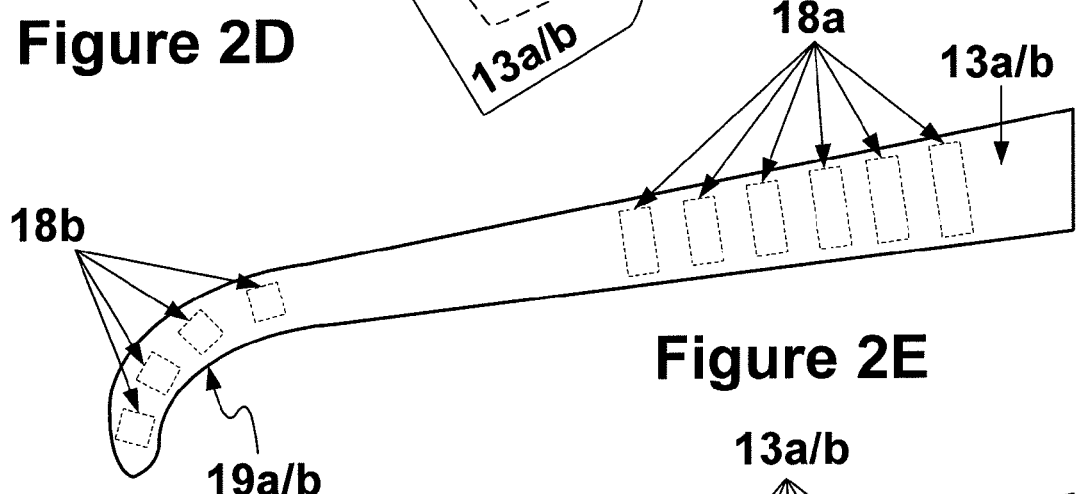
Figure 2F:
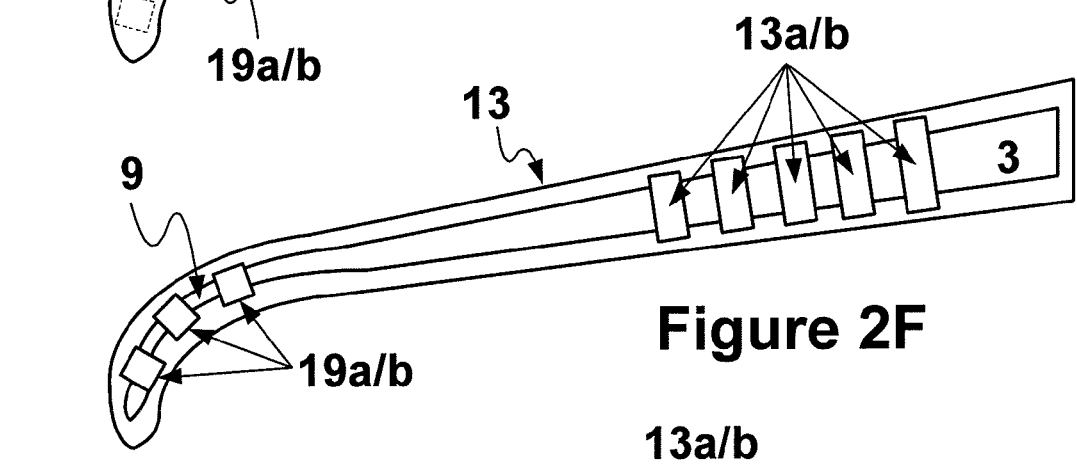
Figure 2G:
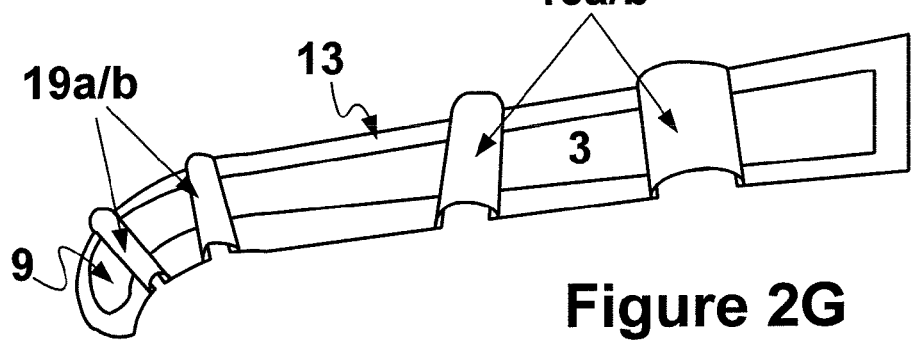

According to the illustrative embodiment of FIG. 2E, a sleeve 13 may have one or more portions 18a cut from the parts of sleeve 13 which are substantially in contact with leg 3. Additionally, sleeve 13 may also have in combination with or exclusive of portions 18a, one or more portions 18b cut from the parts of sleeve 13 which are substantially in contact with temple arm 9. The removed portions 18a and 18b may be shown as vacancies in the surfaces 13a/b of sleeve 13. As will be further shown, portions of leg 3 and/or temple arm 9 may be received within the vacancies formed by removed portions 18a and 18b, respectively. For example, in the illustrative embodiment of FIG. 2F, an exemplary leg 3 may be received within the uncut portions 13a/b of sleeve 13 and an exemplary arm 9 may be received within the uncut portions 19a/b of hood 19. An illustrative embodiment of a sleeve 13 according to FIGS. 2F and 2G may have exposed portions of leg 3 and/or arm 9 between portions of sleeve 13/hood 19. As shown in FIG. 2G, an exemplary cut sleeve 13 may be able to slide up and down the length of leg 3 of ocular product 1. In this way, a cut sleeve 13 may be maneuvered about a variety of lengths of legs 3 to accommodate the stylistic needs of the user or the particular ocular device 1.

According to the illustrative embodiment of FIG. 3A, a full cover 11 may comprise lower cover portions 14 and upper cover portions 15 connected by linker 6. Openings 12 in cover 11 may be found within the combination of cover portions 14 and 15. Elbows 17 may connect sleeve 13 and hood 19 to the cover portions 14/15 of cover 11. As illustrated in FIG. 3A, an exemplary cover 11 is shown in a front view 11a. An exemplary cover 11 may be made of the same or similar materials as sleeve 13, including, but not limited to, silicone, polymer, elastomer, stretchy fibers, and any other flexible materials that may be made to mount on exemplary ocular products 1. Cover 11 may be coated with any non-permanent adhesive or may be made of other such suitable materials that may adhere non-permanently to the surfaces of ocular product 1, including, but not limited to arms 3, frame portions 4/5, bridge 6. Any of the various components of cover 11 may be made of suitable material to stick to itself when wrapped about components of ocular product 1. Alternatively, cover 11 may be coated with non-permanent adhesives, such as UGlu, rubber cement, gummy glues, such as those made by Power Adhesives and available from Hotmelt.com located in Edina, Minn.

In the illustrative embodiment of FIG. 3B, cover 11 may be situated to reveal its back view 11b, including back faces 14b and 15b of lower cover portion 14 and upper cover portion 15, respectively. In this view, an exemplar cover 11 may have back faces 13b of sleeves 13 as well as top surfaces 13c of sleeves 13. Each of the sleeves 13 may terminate in an arm hood 19. Coupling sleeves 13 to the remainder of cover 11 are elbows 17. According to an exemplary embodiment, elbows 17 may be integrated as one piece with the remainder of cover 11 portions 14/15 and sleeves 13. As illustrated according to the illustrative embodiment of FIG. 3B, the entrance of sleeve 13 channel 13f may be coterminous with the back face 17b of elbow 17. According to an exemplary embodiment, an exemplary leg 3 of an exemplary ocular product 1 may be disposed within channel 13f and covered by sleeve 13 and elbow 17.

Figure 3C:
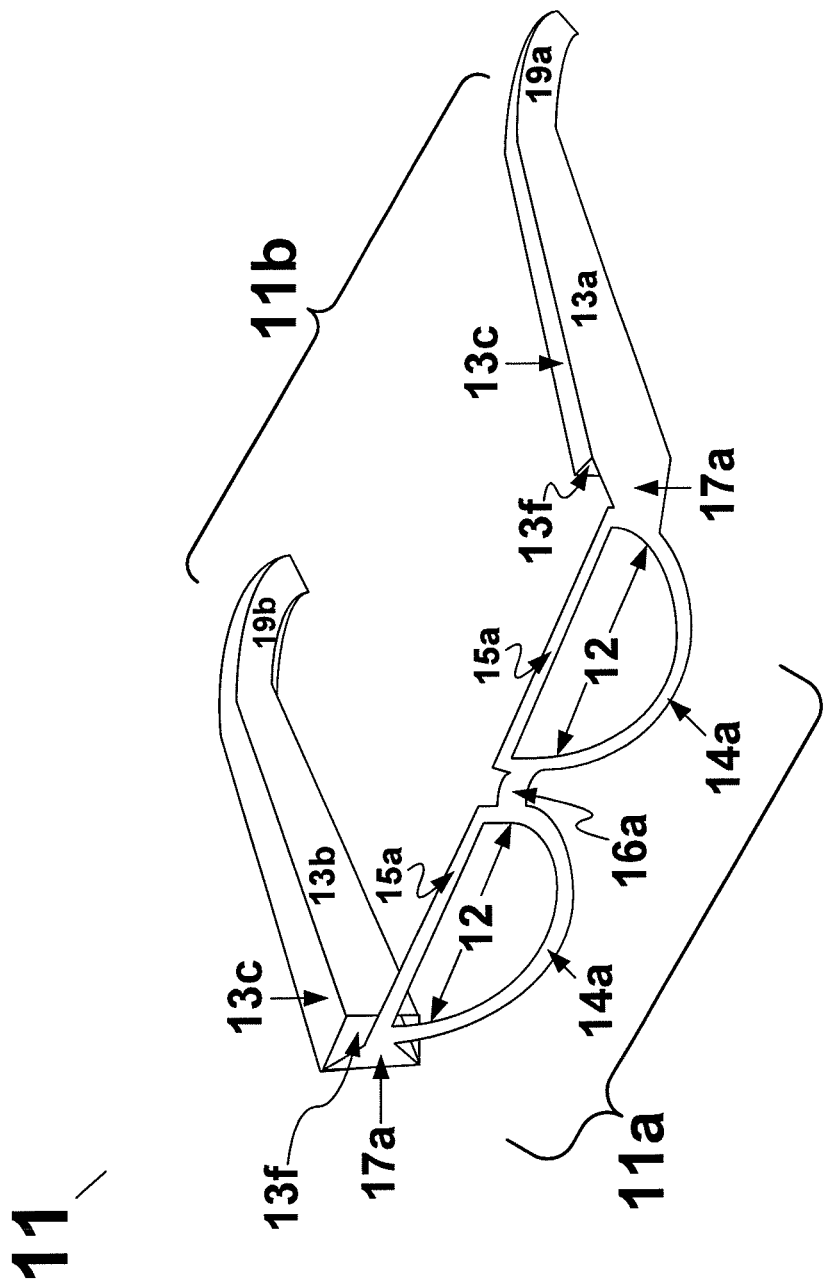
FIG. 3C illustrates an isometric view of another exemplary ocular product customization.

In the illustrative embodiment of FIG. 3C, cover 11 may be shown in an exemplary isometric view with both its front view 11a and back view 11b in view. Cover 11 may be made out of silicone, polymer, elastomer, stretchy fibers, and any other flexible materials that have patterns, colors, or other designs drawn, painted, etched, or otherwise placed thereon. Any decorations known to those skilled in the art may be placed on an exemplary cover 11, including rhinestones, glitter, and gems, or other types of decorative items that may be used in clothing, costumes, masks, or other paraphernalia. Accordingly, an ocular product 1 with frames 4/5 and legs 3 of one color may be adorned with an exemplary cover 11 to have a different color frame 4/5 and/or legs 3. Alternatively, different portions of an exemplary cover 11 may be colored, patterned, designed, painted, etched, or otherwise decorated in one fashion that is the same or different from other portions. For example, frames 15a/14a may be a bright color with a smooth surface while sleeves 13a, 13b, 13c may be a darker color and have corrugations in one or more of their surfaces. Further, openings 12 may contain films, plastics, or other translucent materials that may go over vision portals 2 of an exemplary ocular product. For example, openings 12 may be draped with a thin, red translucent plastic so that when worn, vision portals 2 would allow for viewing objects in a redder tint. Additionally, openings 12 may be covered with plastic material that allow for viewing three-dimensional media, such as three-dimensional vision glasses, that when placed over vision portals 2, allow a user to see surroundings as though they were wearing three-dimensional vision glasses.

Figure 4:
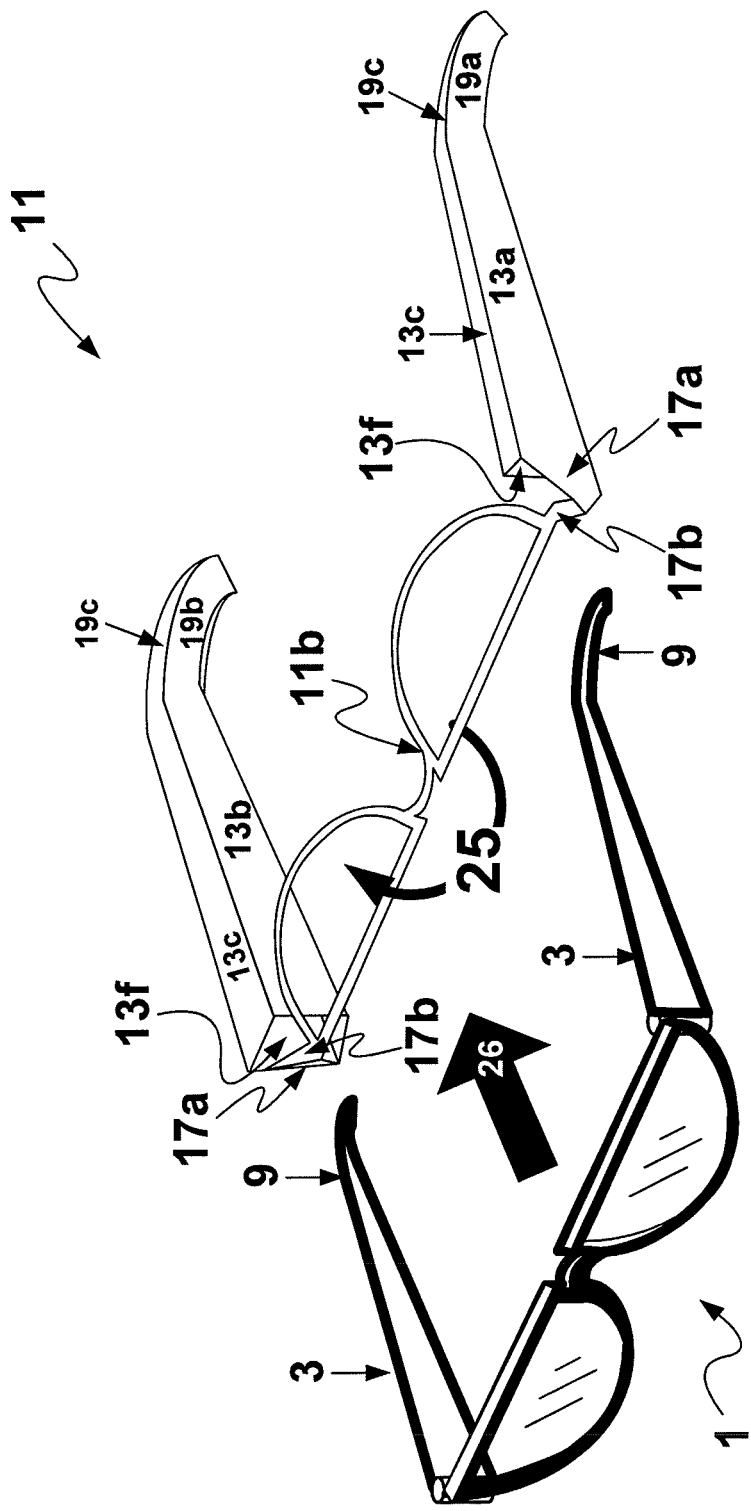
FIG. 4 illustrates an exemplary ocular product and an exemplary ocular product customization.

With reference to the illustrative embodiment of FIG. 4, an exemplary ocular product 1 may be received within channels 13f of sleeves 13 by contorting cover 11 to allow a substantially unobstructed reception of legs 3 within channels 13f. An exemplary contortion 25 may include twisting, bending, stretching, flipping, or otherwise elastically deforming cover 11 to allow ocular product 1 to be received therein. In an exemplary embodiment, ocular product 1 may be moved in direction 26 while cover 11 is contorted by a flipping motion 25. Flipping motion 25 rotates frames 15/14 of cover 11 so that the back face 11b of cover 11 is turned toward the front so as to allow ocular product 1 to slide into sleeves 13 without being obstructed by frames 15a and 14a. In a further exemplary embodiment, contortion 25 may also bend elbows 17 so that elbows 17 do not obstruct cover 11's reception within sleeves 13 of cover 11. In one exemplary embodiment, a flipping motion 25 may cause the backside 17b of elbows 17 to be shown in the front while also twisting elbow 17 so that it substantially provides clearance for entry of temple arms 9 and legs 3 into channels 13f. Other such contortions and manipulations of cover 11 may be utilized to allow coupling of cover 11 to ocular product 1, including coupling the cover components in pieces via physical, adhesive, or other such coupling mechanisms described herein and otherwise known to persons skilled in the art, stretching elbows 17 to allow the sleeves 13, first, and then the frames 14/15 to slide over the respective portions of ocular product 1, and/or utilizing a zipper on one or more cover 11 components, e.g., sleeve 13, to enclose an ocular product 1 therein.

The illustrative embodiment of FIG. 5A may show an exemplary cover 11 adorning ocular product 1. In an exemplary embodiment, the front face 1a of ocular product 1 are in contact with the back face 11b of cover 11 such that the front faces 4a, 5a, and 6a of ocular product 1 may be substantially aligned with back faces 14b, 15b, and 16b of cover 11. Further, an exemplary cover 11 may have an elbow 17 which covers the coupling arrangement of leg 3, hinge 7, and frame 4/5 of ocular product 1. Thus, in such an exemplary arrangement, hinge 7, leg 3, and frame 4/5 may be hidden from view by at least elbow front face 17a. According to the exemplary embodiment of FIG. 5A, vision portals 2 may contain a series of lenses that are unobstructed by complementary shaped openings 12 in cover 11. Front faces 14a, 15a, and 16a of cover 11 may be designed to make ocular product 1 appear differently than it did before. According to this exemplary embodiment, ocular product 1 would still have its original coating on un-covered portions such as back view of frame 5b. In accordance with the disclosures contained herein, legs 3 may be located within sleeves 13 made up of sides 13a, 13b, and 13c and temple arms 9 may be located within gloves 19 made up of sides 19a, 19b, and 19c.

With reference to the illustrative embodiment of FIG. 5B, an exemplary cover 11 may have additional cover materials draping over portions of ocular product 1 that would otherwise be exposed as shown in FIG. 5A. For example, an upper bridge covering 16c may substantially cover bridge 6 across its top face 6c. In this manner, similar cover portions branching off of cover 11 may substantially cover other exposed portions of ocular product 1.

With reference to the illustrative embodiment of FIGS. 6A and 6B, an exemplary cover 11 may have extensions from its cover surfaces 14, 15 and 16 that provide additional covering of ocular product 1 components 4, 5, and/or 6. For example, in a backside view 11b of an exemplary cover 11, one or more material extensions 14c, 15c, and 16c, may flow from the material making up frames 14, 15, and bridge 16, respectively, of cover 11. The shape and size of each extension 14c/15c/16c may be configured for a particular ocular product 1, designed for a particular type of cover 11, or a combination of both. The material making up an extension of cover 11 may be the same or different from the material making up cover 11. In the latter case, extensions may be adhered, heat bonded, welded, stitched, sewed, or otherwise molded atop of cover 11 for adorning an exemplary ocular product 1. In an exemplary embodiment, bottom frame cover portion 14 from the backside view 14b may have a shape that matches the contours of cover portion 14, e.g., an elliptical shaped extension, flowing from the bottom portion of cover portion 14. According to this exemplary embodiment, an exemplary bottom extension 14c may be used to drape around the bottom frame portion 4 of an exemplary ocular product 1. In an exemplary embodiment, top frame cover portion 15 from the backside view 15b may have an extension 15c flowing from the top cover portion 15. An exemplary top cover extension 15c may be shaped according to the contours of cover portion 15, but may be shaped in any other manner based on the design and shape requirements of cover 11, ocular product 1, or a combination of the two. Similarly, link 16 of cover 11 may have an extension 16c flowing from its surface and may also be shaped in any manner depending on design and covering needs of an exemplary cover 11, exemplary ocular product 1, or both.

As illustrated in FIG. 6B, an exemplary cover 11 may be shown from the front side 11a as it would cover an exemplary ocular product 1. According to the exemplary illustration in FIG. 6B, vision portals 2 of an exemplary ocular product 1 may contain lenses. An illustrative embodiment of FIG. 6B may show an ocular product 1 being covered by cover 11 and its various extensions 14c, 15c, and 16c. As previously discussed, these extensions may be mounted onto the front face 11a by an adhesive, heat bonding, sewing, stitching, welding, or any other coupling arrangements known to those skilled in the art. An exemplary extension 14c may be wrapped about the curved portion of lower frame portion 4 while the extension 15c may be wrapped over substantially un-curved portions of the tope surface 5c of upper frame portion 5. Additionally, extension 16c may be wrapped over, and may also be wrapped around bridge 6 to cover bridge top surface 6c. In an exemplary embodiment, the front view 1a and back view 1b of ocular product 1 may be substantially covered by cover 11 by its various extensions. In another exemplary embodiment, cover 11 extensions may be used to provide additional coupling sites for cover 11 on ocular product 1.

Figure 7A:
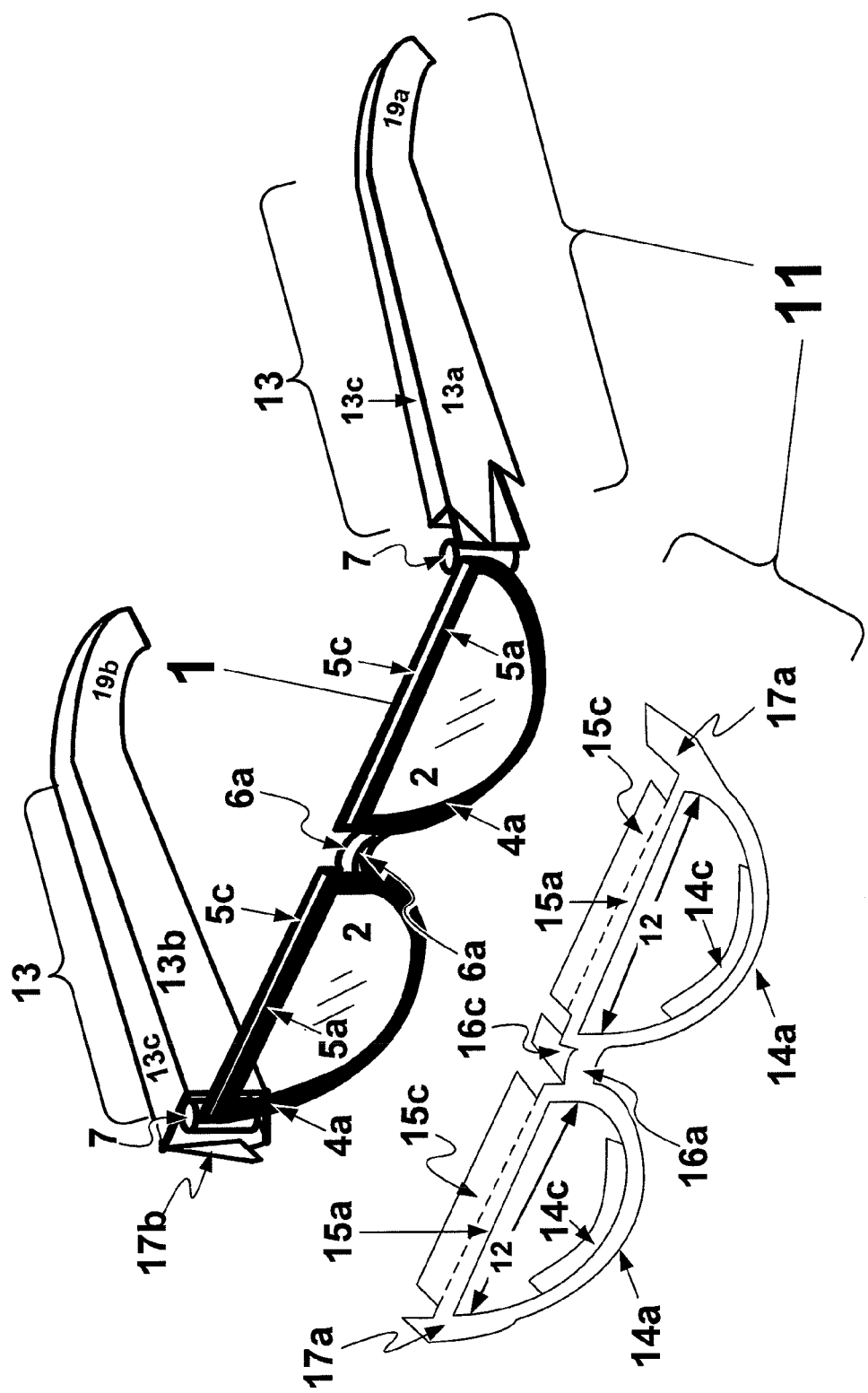
FIG. 7A illustrates an isometric view of an exemplary ocular product in combination with another exemplary ocular product customization.

To further illustrate the coupling of cover 11 to an exemplary ocular product 1, reference may be made to FIG. 7A. According to the illustrative embodiment of FIG. 7A, a portion of cover 11 bearing cover portions 14/15/16/17 with their respective extensions 14c/15c/16c may be shown in a configuration for being received on ocular product 1. While cover 11 has been shown to be separated between the cover portions 14/15/16/17 and sleeves and gloves 13 and 19, respectively, an exemplary cover 11 may have removable cover portions 14/15/16/17 or merely allow for the elastic extension of such portions from sleeves 13. In an exemplary embodiment, elbows 17 may be stretched to a certain length (not shown) so as to provide adequate clearance for insertion of ocular product 1 within sleeves 13 and gloves 19. When released, elbows 17 may regain their original size and shape and draw in the cover portions 14/15/16 atop their respectively covered parts 4/5/6. According to this exemplary embodiment, elasticity of elbows 17 may allow for the folding of legs 3 within sleeves 13 and gloves 19 while ocular product 1 is covered. In this way, an exemplary covered ocular product 1 may be operated and stored just as any uncovered ocular product 1.

Figure 7B:
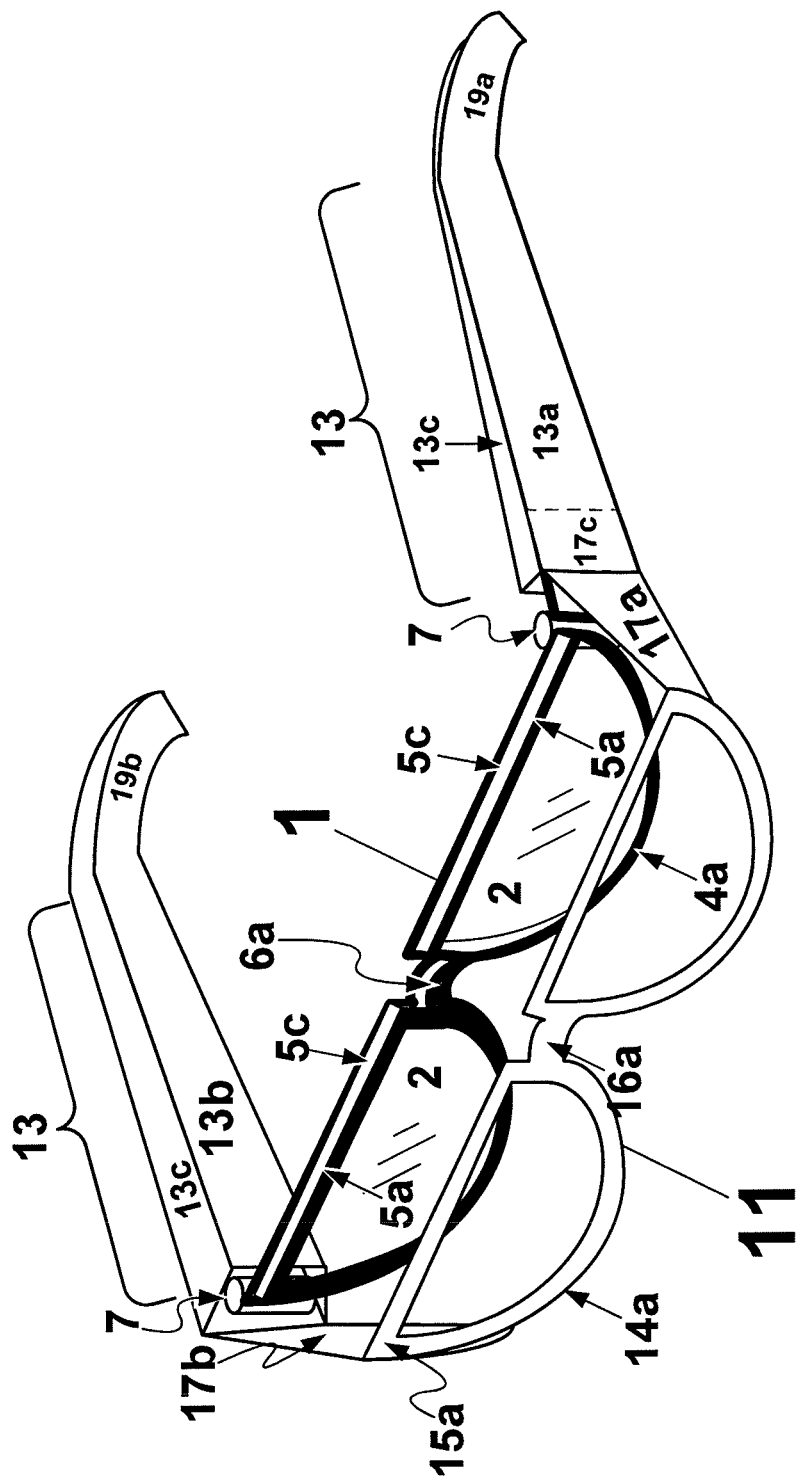
FIG. 7B illustrates another isometric view of another exemplary ocular product in combination with another exemplary ocular product customization.

In the illustrative embodiment of FIG. 7B, a multi-component cover 11 may be made up of a frame portion 14a/15a/16a/17a and sleeve and glove portions 13/19. According to one aspect of the exemplary embodiment illustrated by FIG. 7B, frame portions of cover 11 may be coupled to frame portions 4a/5a/6a of ocular product 1 already received in sleeves 13 by sliding elbows 17 into channels 13f of sleeves 13 to occupy a brace location 17c within channel 13f. Elbows 17 may be sized and shaped so as to slide within sleeve 13 alongside legs 3 of ocular product 1 while also serving as a coupling piece from sleeves 13 to cover frame portions 14/15/16. In an exemplary cover 11 according to embodiments in FIGS. 7A and 7B, modularity of cover components provide additional customization to ocular products 1 and/or ease of replacement of certain cover components in the event of loss or damage of the same. For example, a cover 11 may be comprised of multiple types of sleeves 13 and frame cover portions 14/15/16 depending on the need, without concern for selecting a single, unitary cover 11 embodying all such portion or sleeve designs.

Figure 8:
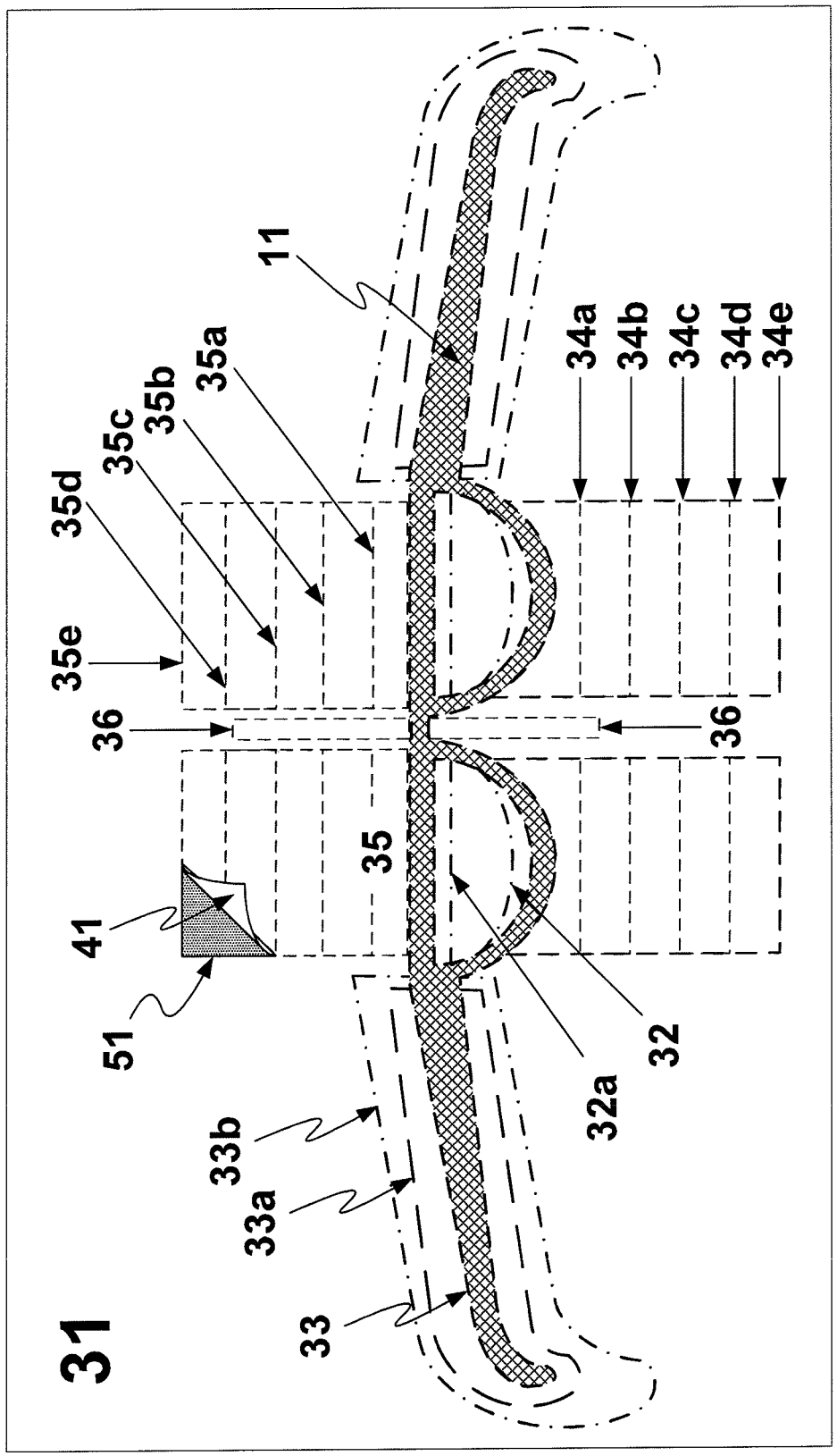
FIG. 8 illustrates an exemplary sheet for an exemplary ocular product customization.

Turning to the illustrative embodiment of FIG. 8, an exemplary cover 11 may be pre-formed on a sheet 31 of suitable material for an exemplary cover 11, such as silicone, elastomer, stretchy fabric, or adhesive material. For example, cover 11 may be pre-formed on a sheet that has adhesive 41 disposed underneath it when it is removed from sheet 31 in sections 51. According to the aforementioned example, cover 11 may be peeled off of sheet 31 like a sticker or adhesive material. Sheet 31 may provide guide lines 32-36 for each of the several disclosed portions of an exemplary cover 11. While not illustrated, the legs of cover 11 may also be similarly removable or excisable from an exemplary sheet 31 so as to operate in accordance with the disclosures of FIGS. 2A-G. Further, sheet 31 may provide for a pre-formed cover 11 that may have modular capabilities as described in FIGS. 7A-7B.

As illustrated in the exemplary embodiments of FIG. 8, a user can custom select the size, shape, and location of exemplary extensions 34a-e, 35a-e, and 36. Additionally, a user can custom select opening 12 of cover 11 by cutting or removing appropriate sheet portions demarcated by 32 and 32a, for example. To accommodate different shapes and sizes of leg 3 of an exemplary ocular device 1, a user may also select the proper outline or combination of leg 3 outlines, for example 33, 33a, and 33b, from sheet 31. While sheet 31 may be illustrated as comprising all components of cover 11 integrated as one part, those skilled in the art may also understand that any number of sheets 31 may be used and made of differing materials to make different components of cover 11 that may be combined after extraction from an exemplary sheet 31 to make cover 11 in accordance with the disclosures herein.

According to the various coverings 11 and sleeves 13 described, an exemplary combination of cover 11 and ocular product 1 may be used together without interference in operation of one or the other. For example, cover 11 may not interfere with the ability to wear ocular product 1 while being covered by cover 11. Alternatively, cover 11 may provide additional benefits for an exemplary ocular product 1 such as structural fortification, reduction of slippage of ocular product 1 during activities (e.g., slipping of bridge 6 about the nose of a user), or reducing wear on the exterior or interior components of ocular product 1.

While the devices, methods, and systems may be described by way of example embodiments, it is understood that the words which have been used herein are words of description, rather than words of limitation. Changes may be made, within the purview of the appended claims without departing from the scope and spirit of the system and method in their broader aspects. These disclosures should be understood to involve interrelationships between the various structures, materials, and embodiments, and it is understood that such interrelationships are not limited to the particulars disclosed.

I claim:

1. A device, comprising:
a first portion substantially shaped like an ocular product frame and designed to substantially cover the ocular product frame; and
a second portion substantially shaped like a sleeve in the shape of an ocular product leg and designed to substantially cover all of the at least one side of the ocular product leg, wherein the outermost side of the sleeve of the second portion is integral with the first portion.

2. The cover of claim 1, wherein the first portion comprises openings through its surface.

3. The cover of claim 2, wherein the openings are intermittent.

4. The cover of claim 3, wherein the openings are translucent.

5. The cover of claim 4, wherein the openings alter at least one of the color, dimension, and size of objects seen through them.

6. The cover of claim 1, wherein the second portion substantially covers all of the ocular product leg.

7. The cover of claim 1, wherein the second portion substantially covers the outer-most portion of the ocular product leg.

8. The cover of claim 1, wherein the second portion intermittently covers at least one other side of the ocular product leg.

9. The cover of claim 1, wherein one of the first portion and the second portion has an adhesive.

10. The cover of claim 1, wherein the cover is configured to couple to an ocular product via a friction fit.

11. The cover of claim 1, further comprising a third portion extending from the first portion for additional coupling of the first portion to the ocular product frame.

12. The cover of claim 11, wherein the third portion extends from a link connecting substantially similar halves of the first portion.

13. The cover of claim 12, wherein the third portion is designed to couple to a bridge of the ocular product frame.

14. The cover of claim 1, wherein the first portion and the second portion are a unitary piece of material.

15. The cover of claim 14, wherein the material is flexible.

16. The cover of claim 15, wherein the material is an elastomer.

17. A method for customizing an ocular product, comprising
torsionally bending a first portion of a cover, wherein the cover is designed to couple to an ocular product frame, the cover being integrally coupled to at least two second portions that are sleeves in the shape of an ocular product leg and designed to couple to an ocular product leg;
coupling two legs of an ocular product to the at least two second portions by bypassing the bent first portion; and
unbending the first portion of the cover to couple to the ocular product frame.

18. The method of claim 17, wherein the bending of a first portion of a cover includes bending an elbow coupling the first portion to the second portion.

19. The method of claim 18, wherein the coupling two legs of an ocular product to the at least two second portions includes inserting the two legs within the at least two second portions.

20. The method of claim 17, further comprising extensions disposed on the first portion to further couple the first portion to the ocular product frame.

* * * * *